June 6, 1972           J. E. SCHEID           3,667,762
MINIATURIZED TAPE RECORDER
Filed April 6, 1970           3 Sheets-Sheet 1
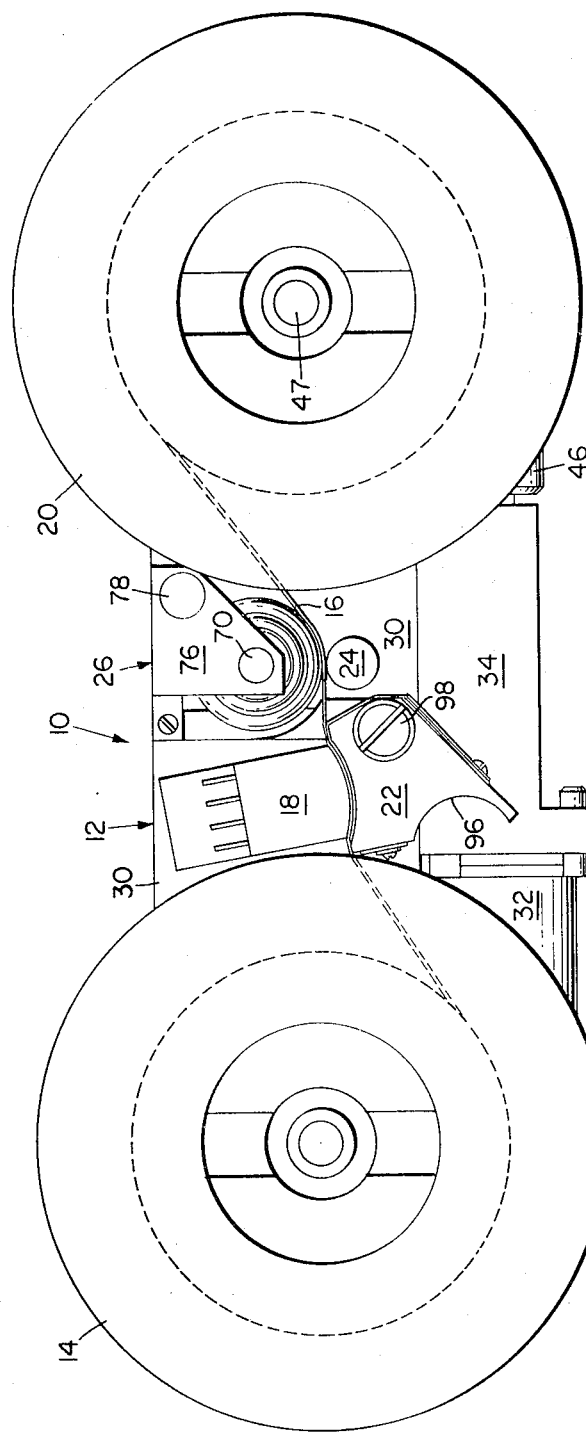
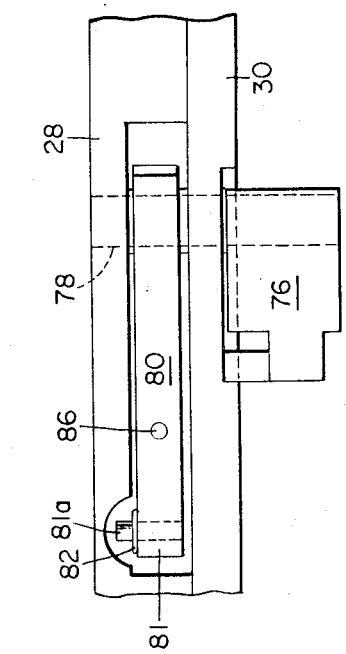
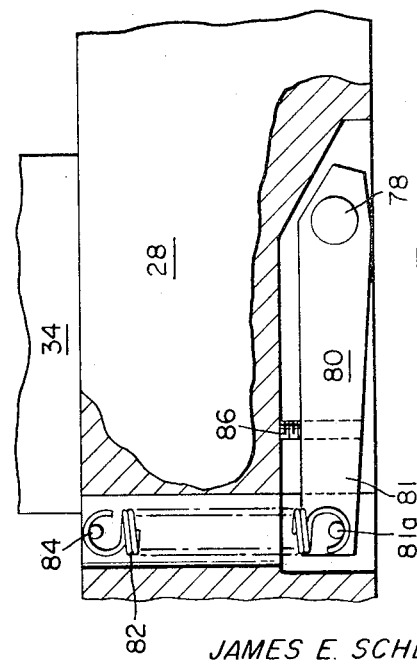
JAMES E. SCHEID
INVENTOR
BY AGENT
ATTORNEY

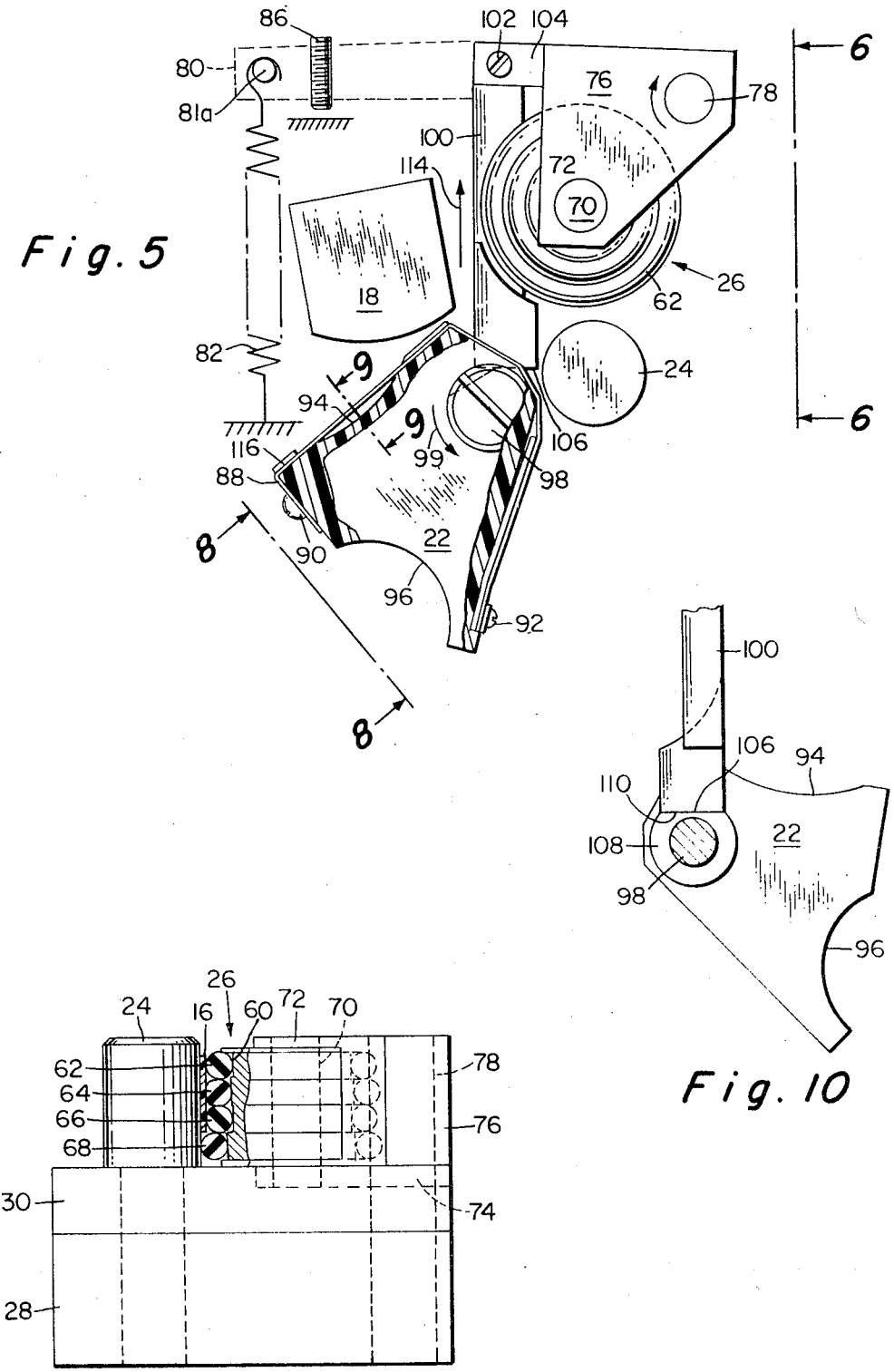

United States Patent Office 3,667,762
Patented June 6, 1972

3,667,762
MINIATURIZED TAPE RECORDER
James E. Scheid, Oxnard, Calif., assignor to the United States of America as represented by the Secretary of the Navy
Filed Apr. 6, 1970, Ser. No. 25,771
Int. Cl. G11b 15/29
U.S. Cl. 274—4 D                7 Claims

ABSTRACT OF THE DISCLOSURE

A small, rugged tape recorder especially adapted for use in biomedical research and for aircraft, missile and undersea instrumentation systems where space limitations preclude the use of standard-size equipment. A feature of the design is that tape-to-head contact is independent of tape tension. Short-term speed variations (wow and flutter) do not exceed 1.2% peak-to-peak in the frequency range of zero to 70 hertz.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In certain instances, the employment of conventional data-recording apparatus is not feasible. For example, when it is desired to record the physiological reactions of an aircraft pilot during flight, the recording device itself should preferably be closely associated in a physical sense with the individual under observation. This eliminates interconnecting wires which might pick up spurious electromagnetic energy generated by the aircraft power plant or by nearby radio communication equipment.

However, this expedient is not normally possible due to the size and weight of available recorders which, of necessity, must be mounted in the aircraft cockpit at some distance from the pilot and joined to sensors on the pilot's body by fairly long conductors. Not only are these conductors exposed to stray electromagnetic fields, but there have been occasions when they have hampered the pilot in this manipulation of the aircraft flight controls.

SUMMARY OF THE INVENTION

The present concept is directed to a tape recorder which has been "miniaturized" without sacrificing quality of reproduction or reliability. A unique design is presented in which tape-to-head contact is independent of tape tension, while constant tape speed across the head is maintained by a capstan/roller assembly wherein a plurality of deformable O-rings urge the tape into such positive engagement with the capstan that slippage is virtually non-existent. The overall dimensions of the recorder are such that it may be strapped directly to the body of an individual under observation, such for example as to one leg of an aircraft pilot, thus eliminating the need for long interconnecting wires.

STATEMENT OF THE OBJECTS OF THE INVENTION

One object of the present invention, therefore, is to provide a tape recorder that is small in size and light in weight, but which nevertheless possesses excellent reproduction characteristics combined with high reliability.

Another object of the invention is to provide a tape recorder in which tape-to-head contact is independent of tape tension.

A further object of the invention is to provide a capstan/roller assembly that acts to maintain constant tape speed across the head, thereby essentially eliminating short-term velocity variations together with the "wow" and "flutter" caused thereby.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a plan view of a tape recorder designed in accordance with a preferred embodiment of the present invention;

FIG. 2 is a side view of a portion of the recorder of FIG. 1 after the latter has been inverted in position;

FIG. 5 is a detailed view of certain of the components of the recorder of FIG. 1 in the positions assumed thereby during loading or unloading of tape;

FIG. 6 is a detailed view, partly in section, of the roller/capstan assembly of the recorder of FIG. 1;

FIG. 7 is a bottom view, partly broken away, of the tensioning spring assembly of the recorder of FIG. 1;

FIG. 10 is a detail view of the tape block of the recorder of FIG. 1 showing the under surface thereof.

DESCRIPTION OF THE PREFERRED EMBODIMENTS

Figure 3:
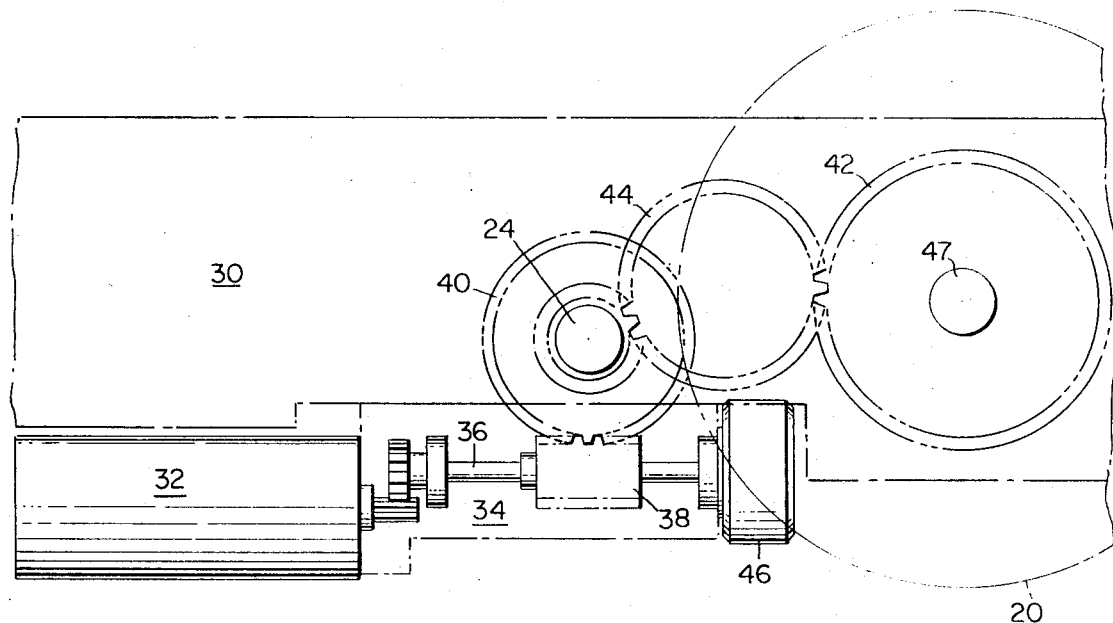
FIG. 3 is a view of the tape transport mechanism of the recorder of FIG. 1 with the top cover plate removed.

Referring now to FIG. 1 of the drawings, there is shown a tape recorder designed in accordance with a preferred embodiment of the present invention. This recorder, generally designated by the reference numeral 10, comprises a base 12 upon which is mounted a tape supply reel 14 from which a magnetic tape 16 unwinds to pass by a recording head 18 and be wound upon a takeup reel 20. The tape is maintained in close engagement with the head 18 by a spring-biased pressure block 22, while tape transport is achieved through rotation of a capstan 24 against which the tape is urged by a roller assembly 26. The latter can be moved away from the capstan when loading or removal of the tape is to be carried out, as more fully set forth in connection with a description of FIG. 5 of the drawings.

All of the components mentioned above are supported upon the top surface of base 12, such base being composed of two plates 28 and 30 lying face-to-face with one another and hollowed out to create chambers therein for accommodation of a portion of the transport mechanism. A side view of a part of the recorder is presented in FIG. 2 of the drawings, the device being oriented to maintain the left-to-right relationship of FIG. 1; that is, it has been inverted with respect to the showing of such figure.

The tape transport mechanism is designed to move the tape 16 at uniform speed past the magnetic recording/ playback head 18. To accomplish this, a constant speed motor 32 drives the tape through a pinion/gear set 34, best shown in FIG. 3. Shaft 36 has mounted thereon a worm gear 38 which drives a gear 40 carried by the capstan shaft 24. This in turn drives the take-up reel 20 through a clutch input gear 42 carried on the shaft thereof through a transfer gear 44. The gear assembly 40, 42, 44 is located in a chamber formed within the base made up of the two plates 28 and 30 (see FIG. 2).

An inertia wheel 46 is mounted on shaft 36 to increase the angular momentum of the drive mechanism.

Figure 4:
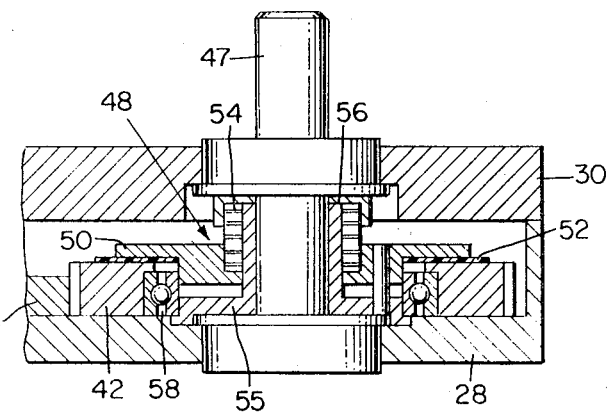
FIG. 4 is a side view, in section, of the take-up reel assembly of the recorder of FIG. 1.

Torque for the take-up reel 20 is applied to its mounting shaft 47 through a slip-clutch arrangement generally indicated in FIG. 4 of the drawings by the reference numeral 48 (FIG. 4). This slip clutch transmits a constant torque to the reel shaft 47 and compensates for the fact that the angular speed of the gear 42 is greater than that required by the take-up reel 20. The slip clutch 48 includes a pressure plate 50 separated from the gear 42 by a liner 52. A pre-load spring 54 encircling a flanged collar 55 fits into a recess in a shoulder disc 56 and is carried within an axial groove in plate 50, as illustrated in FIG. 4. A bearing assembly 58 reduces undesired friction to a minimum. The predetermined tension of spring 54 governs the amount of torque transmitted to the reel shaft 47.

Constant tape speed across the magnetic head 18 is maintained by a capstan/roller assembly shown in FIG. 1 and in greater detailed in FIGS. 5 and 6. A significant feature is the design of the roller, which consists of a plurality of rubber "O" rings carried side-by-side on a flanged sleeve 60. Four such "O" rings are utilized (FIG. 6). Three rings (62, 64 and 66) act to press the tape 16 against the capstan 24 and the remaining ring 68 directly contacts the capstan and drives the roller assembly.

The sleeve 60 rotates about a pivot shaft 70 journalled in two oppositely-disposed arms 72 and 74 of an adapter 76 itself pivotally mounted on a pin or shaft 78 (see also FIG. 2) extending through both base plate 28 and 30.

The sleeve 60 is flanged in what is in effect a series of steps or ridges each of which carries one of the "O" rings 62–68. The flanges carrying the "O" rings 62 and 66 are of the same diameter (FIG. 6) and are chosen so that these "O" rings press the tape 16 firmly against the capstan 24. The flange carrying the "O" ring 64 is of greater diameter (about 4 mils) and this "O" ring acts to press the tape even more firmly against the capstan. Consequently, a "crowing" effect is established which brings about a stabilization of tape position. The fourth, or bottom, "O" ring 68 is 6 mils greater in radius than ring 64 and does not contact the tape, but drives the roller assembly 26 directly. It transmits a high driving force to the tape 16 for a given roller pressure.

The latter is produced by action of an assembly including a rocker arm 80 (FIG. 2) located in a recess in base member 28 and attached near one end to shaft 78. The other end 81 of arm 80 is connected by pin 81a to a coil spring 82 (see also FIGS. 5 and 7) the remaining extremity of which is secured to a fixed pin 84. Consequently, rotation of the shaft 78 (as viewed in FIGS. 1 and 5) is against the tension of spring 82, the latter tending to press the rollers 62 through 66 against the tape 16 while the recorder is in operating position as shown in FIG. 1. Pressure between roller and capstan is determined by the setting of the arm adjustment screw 86 (FIGS. 2, 5 and 7).

It has been found that the roller design herein set forth is superior to one in which the rubber roller surface is brought to size by conventional grinding methods.

The tape block 22 (FIGS. 1 and 5) guides the tape 16 from the supply reel 14 across the magnetic head 18 to the capstan 24. Tape-to-head contact is independent of tape tension, and is maintained by a band or strip of Mylar-backed Teflon, identified in FIG. 5 by the reference numeral 88, which is secured to the tape block 22 by the fasteners 90 and 92. The block 22 has a recess or re-entrant portion 94 across which the Teflon strip extends. This recess 94 is contoured to conform to the active surface configuration of the head 18, so that the tape is compressed between the head 18 and the Teflon band, the latter assuming a "bowed" configuration when the reactor is in the operating position of FIG. 1. However, the strip 88 is also under stress when the block 22 is in the open position of FIG. 5, assuming an essentially linear form across the ends of the recess 94.

Figure 8:
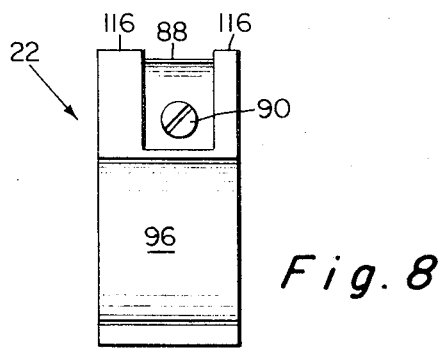
FIG. 8 is a view of a portion of FIG. 5 taken in the direction of the arrows 8—8.

FIG. 8 is a view of the tape block 22 of FIG. 5 in the direction of the arrows 8—8. A contoured region 96 is provided to facilitate manual pressure on the block 22 so as to rotate the latter about its pivot shaft 98 in the direction of the arrow 99 in FIG. 5 (counterclockwise) when it is desired to load the recorder or to remove the tape therefrom when recording is complete.

The Teflon strip 88 of FIG. 5 tends to assume the contour of both the recess 94 and the active portion of magnetic head 18 when the assembly is in the recording position of FIG. 1. In other words, the Teflon band 88 is guided by the same surfaces that guide the tape 16, and this uniformity in alignment results in uniform pressure on the tape in the vertical direction. In addition, the band 88 "wraps" over the head 18 with the same geometry as the tape, which creates a relatively large region of uniform pressure on the tape. The low coefficient of friction for Teflon allows this larger degree of head "wrap," while the constant value of this coefficient maintains uniformity of tape tension.

The band 88 is pressed against the tape 16 by action of the same spring 82 that urges the roller assembly 26 against the capstan 24. FIG. 5 of the drawings brings out this interrelationship. It will be noted that an arm 100 is pivotally attached at 102 to a projecting portion 104 of the adapter 76 which forms part of the roller assembly 26. This arm extends downwardly (in FIG. 5) beneath the "O" rings 62–68, and the lower end 106 thereof engages the peripheral surface of a collar 108 one portion 110 of which is flattened to provide a camming action with respect to end portion 106 of arm 100 when the block 22 is rotated from its position of FIG. 1 in the direction of the arrow 99 in FIG. 5. This moves the arm 100 upwardly in the direction of the arrow 114, and pivots the roller assembly 26 about shaft 78 against the tension of spring 82.

Figure 9:
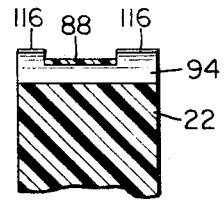
FIG. 9 is a sectional view of a portion of FIG. 5 taken along the line 9—9.

The tape block 22 is provided with raised shoulders 116, best shown in FIGS. 8 and 9, to guide the tape 16 as it passes across the head 18 and keep it aligned with the Teflon strip 88.

To load the recorder, the tape block 22 is manually actuated to the position of FIG. 5. This not only separates the block 22 from contact with the head 18, but also moves the roller assembly 26 away from the capstan 24. One end of the tape is secured to the take-up reel 20 and the latter is revolved several times to align the tape between the shoulders 116 of the block 22, after which the latter is moved to its operating position of FIG. 1 and loading is complete.

The supply reel 14 has a drag plate (not shown) associated therewith which is effective conventional fashion to preclude tape over-run and provide a constant restraint to unwinding of the tape from the reel. This drag action is coordinated with the action of the take-up reel clutch unit of FIG. 4 and the pressure of tape block 22 against head 18 (the effective tension of spring 82) so that the torque setting of the supply reel can be set at a level just sufficient to prevent over-running. The total tape tension effective at the capstan 24 (which is the sum of the varying tension as the supply reel 14 changes radius and the constant tension across the head 18) varies only slightly from beginning to end of a tape run.

The drive motor 32 is of the direct-current type with a mechanical governor. One which has proven to be satisfactory in practice is a Globe unit requiring 4 watts at 9 to 12 volts. However, many other commercially-available motors may be substituted therefor if desired.

Obviously many modifications and variations of the present invention are possible in the light of the above teachings. It is therefore to be understood that within the scope of the appended claims the invention may be practiced otherwise than as specifically described.

I claim:
1. In a data storage device of the type in which a magnetic tape is unwound from a supply reel and travels past a recording head and a capstan to be wound upon a take-up reel, the combination of:
   a tape block located adjacent said head and biased toward said head so as to press said tape thereagainst during operation of said device, said tape block being displaceable away from said head during loading or unloading of said tape, that portion of said tape block which is effective to press said tape against said head during operation of said device being contoured to be essentially complementary to that portion of said head against which it passes;
   a roller assembly driven by said capstan and biased toward said capstan so as to press said tape thereagainst during operation of said device, said roller assembly being displaceable away from said capstan during loading or unloading of said tape;
   both said tape block and said roller assembly being biased by a common resilient member;
   means acting upon a displacement of said tape block away from said head for displacing said roller assembly away from said capstan, said means for displacing said roller assembly away from said capstan acts against the biasing action of said common resilient member;
   the contoured portion of said tape block being in the form of a reentrant region, further comprising a plastic strip stretched across the extremities of said reentrant region and deformable to the contour of said head when brought into face-to-face contact with said tape in response to the biasing action of said resilient member.

2. The combination of claim 1 in which the surface of said plastic strip contacting said tape is coated with a substance having a low coefficient of friction.

3. The combination of claim 1 in which said take-up reel has a drag clutch associated with the shaft on which said take-up reel is mounted.

4. The combination of claim 3 in which said supply reel has a drag brake associated with the shaft on which said supply reel is mounted.

5. A data storage device as set forth in claim 1, in which said roller assembly includes a plurality of resilient O-rings one of which contacts said capstan directly and the remainder of which contact said tape so as to press the latter against said capstan during operation of said device, the O-ring directly contacting said capstan acting to drive said roller assembly in response to rotation of said capstan.

6. The combination of claim 5 in which the O-rings contacting said tape are three in number, the two outer rings having equal diameters and the center ring having a diameter greater than that of such outer rings.

7. The combination of claim 1 in which said common resilient member which acts to bias both said tape block and said roller assembly is in the form of a coil spring, further comprising means for adjusting the tension of such spring so as to vary the biasing action effected thereby.

References Cited
UNITED STATES PATENTS

| | | | |
|---|---|---|---|
| 2,682,410 | 6/1954 | Bauman | 274—4 R |
| 3,077,293 | 2/1963 | Watkins | 226—186 |
| 3,240,442 | 3/1966 | Kilmartin | 226—193 X |
| 3,101,913 | 8/1963 | Davis | 226—193 X |
| 3,132,785 | 5/1964 | Kunz | 226—190 X |
| 3,421,767 | 1/1969 | Atsumi | 274—4 R |
| 3,073,540 | 1/1963 | Guest | 274—4 R |

HARRY N. HAROIAN, Primary Examiner